Figure 1:
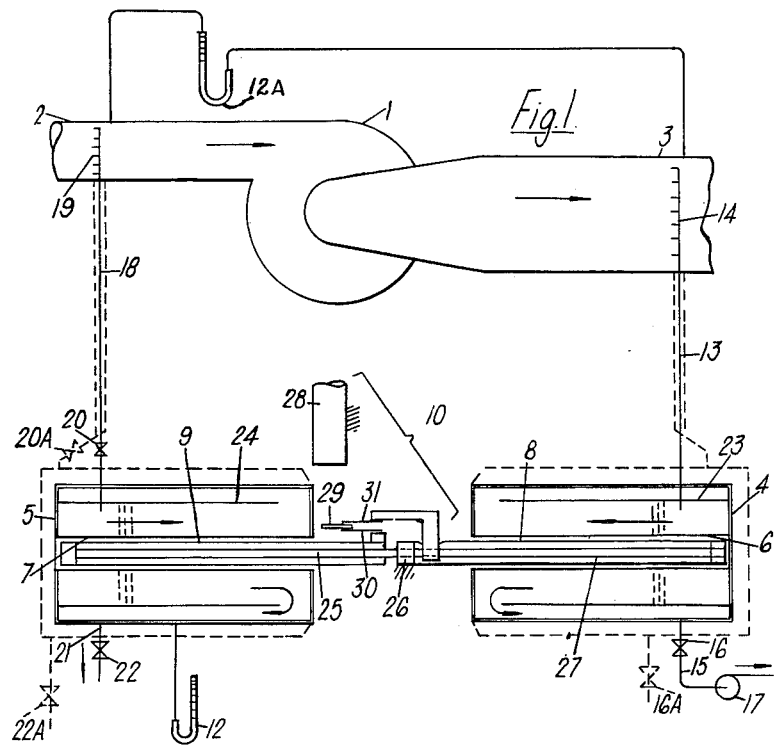

Dec. 28, 1965    J. C. ORKNEY, JNR., ETAL    3,225,591
APPARATUS FOR USE IN MEASURING THE HYDRAULIC EFFICIENCY
OF FLUID MACHINES, SUCH AS TURBINES
Filed July 11, 1962    2 Sheets-Sheet 1

Inventors
John Carnegie Orkney, Junior
John Carnegie Orkney
By
Rommel, Allwine and Rommel Attorneys Dec. 28, 1965    J. C. ORKNEY, JNR., ETAL    3,225,591
APPARATUS FOR USE IN MEASURING THE HYDRAULIC EFFICIENCY
OF FLUID MACHINES, SUCH AS TURBINES
Filed July 11, 1962    2 Sheets-Sheet 2

Inventors
John Carnegie Orkney, Junior
John Carnegie Orkney
By
Rommel, Allwine and Rommel    Attorneys

United States Patent Office 3,225,591
Patented Dec. 28, 1965

3,225,591
APPARATUS FOR USE IN MEASURING THE HYDRAULIC EFFICIENCY OF FLUID MACHINES, SUCH AS TURBINES
John C. Orkney, Jr., The Coach House, Drummond Place Lane, Stirling, Scotland, and John C. Orkney, 92 Switchback Road, Glasgow, Scotland
Filed July 11, 1962, Ser. No. 209,809
Claims priority, application Great Britain, July 12, 1961, 25,815/61
7 Claims. (Cl. 73—112)

This invention relates to apparatus for use in measuring the hydraulic efficiency of fluid machines, such as turbines.

In both thermometric and thermodynamic methods of measuring the hydraulic efficiency of fluid machines such as water turbines, use is made of the fact that release of liquid pressure results in a rise in the temperature of the liquid proportionate to the pressure alteration.

The principle of the conservation of energy leads to the recognised mechanical energy to heat energy conversion factor of approximately 778 ft.-lb./B.t.u., or 1400 ft.-lb./c.h.u. (centigrade heat unit); from which it has been established that an incompressible liquid flowing through a throttling device, without change of state or heat exchange with its surroundings, would show an increase in temperature, at the rate of 1° C. per 1400 ft. head loss. ("Thermodynamic Method of Measuring Turbine Efficiency," D.N. Singh, M.E.R.L. Fluids Report No. 70, August 1958, N.E.L., East Kilbride, Scotland. "Efficiency Measurements for Hydraulic Turbines by the Poirson Thermometric Method," Willm & Campmas, La Houille Blanche Nos. 4 and 5, 1954.) In water, which is a slightly compressible liquid, this rate is modified by the variations in specific volume and internal energy with temperature and pressure. Values of these variations are available in the literature and are known as the alpha and beta factors.

Further, the losses in mechanical energy in hydraulic machines which appear as heat in the discharge from the machine are related in the same manner.

In the thermometric method, platinum resistance thermometers are usually used to measure directly the liquid temperature at the entry and discharge of the machine, and from these temperatures the hydraulic efficiency of the machine is obtainable. Accurate measurements by this method are very difficult to obtain.

In the thermodynamic method, as applied say to a water turbine, usually a sample water flow from the penstock is passed through a container, having inlet and outlet valves, and a pair of platinum resistance thermometers project respectively into the container and into a sample of the tailrace water and are embodied in a bridge circuit. The valves are adjusted to vary the flow until null balance of the bridge network is achieved, and the pressure of the liquid in the container is then measured, this pressure divided by the penstock total head giving the turbine's hydraulic efficiency directly.

In the foregoing methods, the paltinum resistance thermometers are unsatisfactory in that they tend to suffer from hysteresis, ageing and unsteadiness, and require annealing or acclimatization after a journey. Moreover, in the thermodynamic method the bridge network may form an expensive and heavy part of the apparatus.

The object of the present invention is to provide considerably increased accuracy in the measurement of hydraulic efficiency.

According to the present invention, apparatus for use in measuring the hydraulic efficiency of fluid machines, such as turbines, comprises high and low pressure containers adapted to permit through flow of sample liquid from the entry and discharge of the machine, a plurality of thermally expansible elongated elements respectively associated with said containers so as to receive heat from the liquid samples, and measuring means operatively connected to the elements so as to indicate changes in the dimensions of the elements and thereby enable the hydraulic efficiency of the machine to be determined.

Preferably the measuring means are adapted to give a null balance indication when the lengths of the elements are the same, and the high-pressure container has inlet and outlet throttle valves to enable adjustment of the liquid temperature for null balance, and has a gauge for measuring the liquid pressure.

The measuring means may be optical, such as a microscope or an auto-collimator, or may be electronic, such as a capacitance or inductance meter.

Embodiments of the invention will now be described by way of example, with reference to the accompanying diagrammatic drawings in which FIGS. 1, 2 and 3 respectively show different forms of apparatus operatively connected to a water turbine.

Referring to FIG. 1, apparatus for use in measuring the hydraulic efficiency of a water turbine 1 with a penstock 2 and a tailrace 3, includes a pair of spaced horizontal co-axial cylindrical containers 4 and 5 connected respectively to the tailrace 3 and the penstock 2 to receive water samples therefrom. The containers have central axial through passages 6 and 7 respectively, and a pair of identical cylindrical brass tubes 8 and 9 extend concentrically within the passages 6 and 7 respectively, the tubes being expansible under the action of heat from the water in the containers. Indicating means 10 are connected to the ends of the tubes 8 and 9 to indicate changes in the dimensions of the tubes, and a manometer 12 is connected to the container 5 to indicate the water pressure in the container. A pipe line 13 extends from a sampler 14 in the tailrace 3 and delivers into the low pressure container 4 and the water sample is dicharged from the container 4 through a pipe 15 which has therein a control valve 16 and a suction pump 17. A pipe line 18 extends from a sampler 19 in the penstock 2 and delivers, through a throttle valve 20, into the high-pressure container 5, and the water sample is discharged from the container 5 through a throttle valve 22 in a pipe 21. Cylindrical baffles 23 and 24 mounted concentrically within the containers 4 and 5 ensure axial flow of the sample water through the containers, over the inner walls thereof.

The pipe lines and containers are fitted with water-jackets, as indicated in broken lines, and water-flow through the jackets from the penstock and tailrace is controlled by valves 16A, 20A and 22A which are duplicates of the valves 16, 20 and 22. Moreover, the jackets are lagged and may in addition be surrounded by air jackets in the form of ducts through which air is forced from a common source by a fan, blower or the like. Thus, thermal gains or losses to the samples are minimised. Further, since it is desirable to keep the remaining thermal gains or losses as similar as possible in both samples, both pipe lines are the same length, and apparatus is provided to show that the rates of flow or the pressure losses through both pipe lines and both jackets are similar, the rates being controlled by the throttle and control valves. Moreover, to minimise the effect of variation in the penstock water temperature, valve or other ocntrol means (not shown) are provided to enable adjustment of the rate of flow of the penstock sample so that the time taken by the sample to reach its container is similar to the time taken for the main body of water to pass through the turbine and for the tailrace sample to reach its container.

The brass tube 9 is mounted on the outer end of a carrier rod 25 of Invar or other low-expansion material which extends co-axially within the tube 9 and is anchored at its inner end to a fixed abutment 26. The brass tube 8 is anchored at its inner end to the abutment 26 and is secured at its outer end to the adjacent outer end of an Invar rod 27 extending co-axially within the tube 8.

The indicating means 10 consists of an auto-collimator 28 which views a mirror 29 carried by a pair of parallel leaf springs 30 and 31 connected respectively to the free outer end of the tube 9 and the free outer end of the rod 27.

Differences in the comparative lengths of the tubes 8 and 9 are converted by the leaf springs into a corresponding tilting movement of the mirror 29, and the auto-collimator 28 measures the corresponding change in angle of a light beam reflected from the mirror.

In use of the apparatus, a steady flow of water is maintained through the high-pressure container 5, and a similar steady flow of water is maintained through the low pressure container 4, being drawn from the tailrace 3 if necessary by operation of the pump 17. The throttle valves 20 and 22 are then adjusted until the auto-collimator indicates null, whereupon the manometer 12 is read and the reading divided by the total penstock head to give the turbine efficiency after corrections relative to the changes of internal energy of water under pressure. The total penstock head is read off from manometer 12A, one limb of which is connected to the penstock 2 and the other to tailrace 3.

Modifications may be made. Thus in the indicating means the tubes or rods may be replaced by bi-metallic strip in flat or coiled form. The containers may be arranged concentrically one within the other, with the expansible members in the space between the containers.

Figure 2:
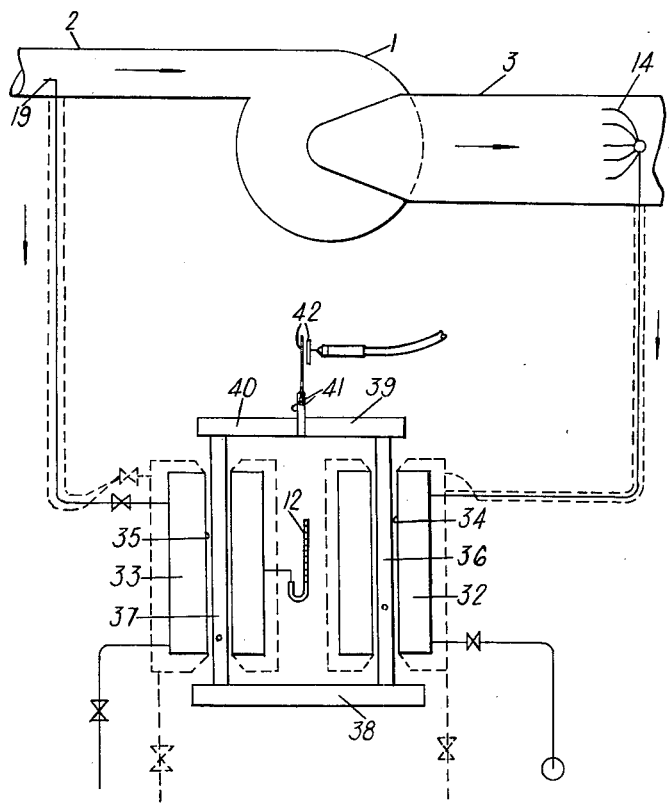

In the form shown in FIG. 2, the apparatus consists of a pair of side-by-side upright cylindrical containers 32 and 33 with central axial through passages 34 and 35 respectively. A pair of identical brass rods 36 and 37 extend through the passages 34 and 35 which may contain oil as a heat transfer medium, and are interconnected at their lower ends by a bar 38, and have lateral arms 39 and 40 at their upper ends. A movement magnifier including a pair of parallel leaf springs 41 connects the arms 39 and 40 to a plate of electronic capacitance meter including a pair of capacitance plates 42, said plate moving towards and from the other plate with variations in the length of one rod relative to the length of the other. The meter is calibrated for null balance indication.

The total penstock head is obtained, as in the apparatus of FIG. 1, from a manometer (not shown), one limb of which is connected to the penstock 2 and the other to tailrace 3.

Figure 3:
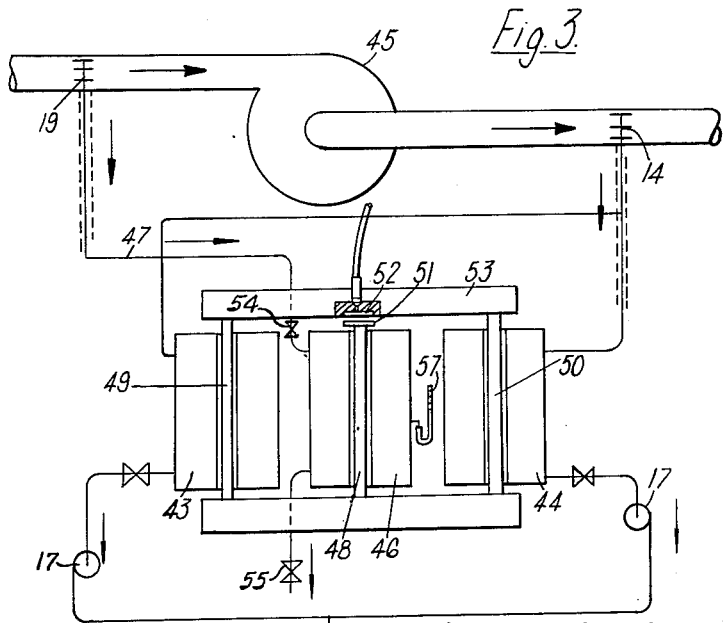

The apparatus of FIG. 3 embodies three containers 43, 44 and 46. The intermediate container 46 constitutes the high pressure container, while the two end containers 43, 44 are coupled together in parallel to constitute a duplex low-pressure container. This apparatus has the advantage of constructional stability. The high pressure container 46, which is between and in line with the other two containers 43, 44 and equispaced therefrom, is connected through conduit 47 to the high-pressure side of the turbine 45 to receive a water sample. Said container 46 has its rod 48, which is identical with the other two rods 49 and 50, connected directly to one plate 51 of the capacitance meter, while the other two rods 49 and 50 are connected directly to the other plate 52 by a bar 53.

With the liquid samples flowing through the containers, the throttle valves 54 and 55 of the high-pressure container 46 are suitably adjusted and the rod 48 of the container 46 is heated and expands to give a null reading on the meter. The pressure in container 46 is measured by means of manometer 57 and the total penstock head is obtained as previously described.

By the use of expansible tubes or rods and an indicator for measuring physical displacement of the tubes or rods, instead of resistance thermometers and a bridge circuit, the apparatus is rendered considerably more accurate, and moreover is more robust.

It will be appreciated that the brass tubes or rods may be replaced by tubes, rods or the like of metal or other material of suitable thermal expansion.

Whatever form of indicator is used, it will usually be possible, and desirable, to use the indicator on a null method basis. Calibration to this end is achieved by setting up the apparatus with fluid of the same temperature (preferably from the same source and not throttled) passing through both (or all) containers simultaneously and, while both (or all) tubes or rods are thus at identical temperatures, setting the indicator to a suitable null point which is regained when the throttling adjustments described above are completed.

We claim:

1. Apparatus for use in measuring the hydraulic efficiency of fluid machines such as turbines with entry and discharge passages comprising first and second sampling members located respectively in said entry and discharge passages for removal of sample liquid from said passages, high and low pressure containers in connection with said first and second sampling members respectively and through which flow the liquid samples from the machine, a plurality of thermally expansible elongated elements extending within said containers so as to receive heat from the liquid samples, measuring means operatively connected to said elements so as to indicate changes in the dimensions of the elements and to give a null balance indication when the lengths of the elements are the same, inlet and outlet throttle valves for the high pressure container to enable adjustment of the liquid temperature therein for null balance and gauges for measuring the liquid pressure in the high pressure container and the total pressure head over the fluid machine, the hydraulic efficiency of the machine being calculated from the ratio of the pressure in the high pressure container to the total pressure head over the machine.

2. Apparatus according to claim 1, wherein the measuring means are operatively connected to the elements through a pair of parallel leaf springs secured to the ends of the elements.

3. Apparatus according to claim 2, wherein the measuring means consist of an electronic capacitance meter having one of its plates mounted on the leaf springs so as to move towards and from the other plate with variation in the lengths of the elements relatively to each other.

4. Apparatus according to claim 2, wherein the measuring means consist of an auto-collimator having its mirror mounted on the leaf springs so as to tilt with variation in the lengths of the elements relatively to each other.

5. Apparatus according to claim 1 wherein the elongated elements are tubes, rods or the like, and the containers have therein recesses into which the elements extend.

6. Apparatus according to claim 1, wherein the measuring means consist of an electronic capacitance meter with its opposed plates connected to the ends of the respective elements.

7. Apparatus according to claim 6 having two low-pressure end containers coupled together in parallel and a high-pressure intermediate chamber, the element of the intermediate container being connected to one plate of the capacitance meter and the elements of the end containers being connected to the other plate so that a null reading is obtained by adjustment of the throttle valves of the high pressure intermediate container.

References Cited by the Examiner

UNITED STATES PATENTS

| | | | |
|---|---|---|---|
| 2,357,921 | 9/1944 | Kenis et al. | 73—112 |
| 2,593,660 | 4/1952 | Dickey | 73—112 |
| 2,826,067 | 3/1958 | Braunlich | 73—168 |
| 2,924,971 | 2/1960 | Schroeder et al. | 73—168 |

LOUIS R. PRINCE, *Primary Examiner.*

JOSEPH P. STRIZAK, RICHARD QUEISSER,
*Examiners.*